Oct. 22, 1963   F. W. AZMUS   3,107,711
STOMPER FOR MEAT GRINDER
Filed June 23, 1961

INVENTOR.
FRED W. AZMUS
BY
Townsend and Townsend
ATTORNEYS

United States Patent Office 3,107,711
Patented Oct. 22, 1963

3,107,711
STOMPER FOR MEAT GRINDER
Fred W. Azmus, 921 Sunnybrae St., San Mateo, Calif.
Filed June 23, 1961, Ser. No. 119,139
1 Claim. (Cl. 146—203)

This invention relates to a meat stomper.

In meat processing it is necessary to put meat in a grinding apparatus in order to grind the meat into ground meat products such as hamburger.

Traditionally, a stomper formed of curved wood has been used for this purpose. The wood has the disadvantage of picking up meat particles which become engrained within the wood structure so that cleaning of conventional stompers becomes extremely difficult. Furthermore, in butcher shops there may be several meat grinding apparatuses each of which have a different neck length so that stompers of various lengths must be employed. Naturally the sanitary problem associated with conventional stompers is quite acute and it is sometimes impossible to completely clean the wood structure, so that after a period of use they become quite offensive and must be discarded.

The stomper also requires a structure which is relatively soft so that in the event it comes into engagement with the blades of the grinder it will not cause damage to the blades. The stomper also must have the sufficient body or weight to allow its full utilization.

It is the object of my invention to provide a plastic stomper which will solve the problems inherent in stompers previously known in the art.

The feature and advantage of my invention lies in the fact that the stomper has an extendable stem so that it can be decreased or increased in length in accordance with the machine for which it is to be used.

Another object of this invention is to provide a stomper made of plastic material but which has weight similar to the wood stompers previously used. This is accomplished by forming the stomper hollow and filling the stomper with material having a higher specific gravity such as water or sand.

Another feature and advantage of this invention lies in the fact that the handle portion of the stomper is threadably engaged with the body of the stomper so that it can be screwed or unscrewed onto the body to effectively lengthen the stomper as well as forming a cap that can be removed to allow the insertion of the weighting material.

It is also believed obvious that another feature and advantage of this invention is that the weight of the stomper can be varied by changing the amount of the weighting material placed inside the stomper.

A further feature and advantage of this invention is that the device herein is to be formed of plastic material and still have a weighting characteristic of a stomper formed of heavier material. The plastic material has the same advantages as wood should the stomper accidentally engage the blades of the meat grinder wherein the blades would not be damaged.

Other objects of the present invention will become apparent upon reading the following specification and referring to the accompanying drawing in which similar characters of reference represent corresponding parts in each of the several views.

Figure 1:
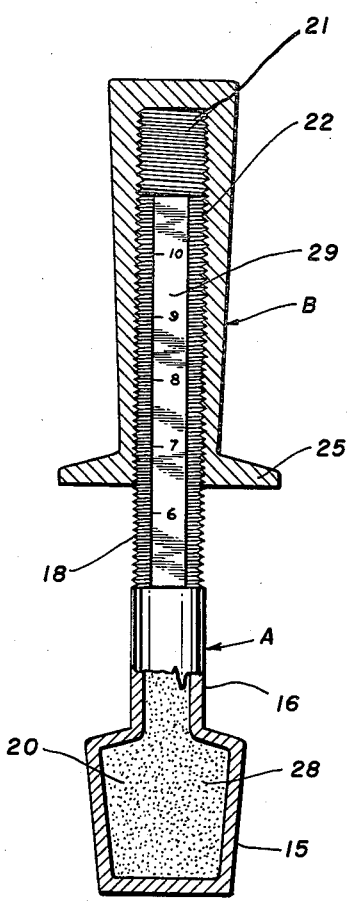
FIG. 1 is a sectional view of the stomper of this invention.
Figure 2:
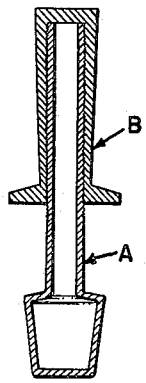
FIG. 2 shows the stomper in the retracted position for minimal length.
Figure 3:
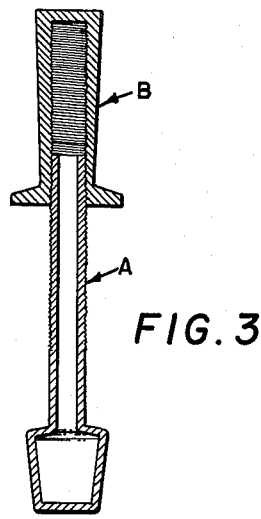
FIG. 3 is a schematic view showing the stomper head in an extended position.

The stomper of this invention comprises a main body section A and a cap or head portion B.

The main body portion is formed with a work head 15 upon which is mounted an elongate shaft 16. The shaft is threaded throughout the upper portion thereof with helical threads 18.

The interior of body portion A is hollow to produce a filler area 20.

The cap or head portion B is formed with an elongated core area 21 threaded at 22 to receive threads 18.

The bottom portion of cap or head portion B is flanged outwardly to provide a hand guard 25.

Filler area 20 is filled with a weighting material such as water or sand 28 to give the device sufficient weight to be easily handled.

The side of shaft 16 is marked with various numerals as indicated at 29 which indicate the effective length of the device as the handle portion is screwed or unscrewed onto threads 18. Thus the desired length can be obtained by moving cap or head portion B to a point where the indication of length is visible by the appropriate numerals appearing on shaft 16.

In operation cap or head portion B is removed from the stomper and an appropriate material is filled within filler area 20.

The specific weight of the device can be controlled by apportioning the amount of material to be put into the device or alternatively a lighter material can be employed.

Both parts of the stomper are formed of plastic material which is generally characterized as having a relatively rigid but nevertheless soft body and which is relatively light weight. The filler material provides for necessary weight for the device and is completely adjustable by the terminal or content and the type of filler material used.

Cap B is then screwed onto threads 18 to a point where the stomper is of adequate length to be used in a meat grinding machine. The stomper is then used in the manner identical to the use of the conventional wood stompers.

If it is desired to use the stomper on a larger or smaller material cap or head portion B can be moved to an appropriate location on the shaft to align with the other machine.

The stomper can be made of plastic material such as tylon or nylon.

Although the foregoing invention has been described in some detail by way of illustration and example for purposes of clarity of understanding, it is to be understood that certain changes and modifications may be practiced within the spirit of the invention as limited only by the scope of the appended claim.

I claim:

A stomper for positioning meat in a meat grinder comprising a plastic main body including an enlarged working head portion and an elongate outwardly threaded hollow shaft portion joined to the working head portion, the interior of said working head portion being hollow and communicating with the exterior of said main body through the hollow bore through said shaft, an elongate head having an elongate bore extending from one end thereof, and threaded to engage the shaft threads of said main body, rotation of said head with respect to the shaft portion of said main body serving to change the length of the stomper, the other end of said head closed to create a completely enclosed cavity within the stomper when the head is threadably attached to the shaft portion of the main body, and weighting material contained within the enclosed cavity.

References Cited in the file of this patent

UNITED STATES PATENTS

| | | |
|---|---|---|
| 83,228 | Warne | Oct. 20, 1868 |
| 278,575 | Maris | May 29, 1883 |
| 874,756 | French | Dec. 24, 1907 |
| 2,203,089 | Hollenback | June 4, 1940 |
| 2,209,386 | Chott | July 30, 1940 |
| 2,737,216 | Kenerson | Mar. 6, 1956 |